G. A. RICHARDS.
CHARGE FORMING DEVICE FOR INTERNAL COMBUSTION ENGINES.
APPLICATION FILED APR. 11, 1919.
1,345,507.
Patented July 6, 1920.
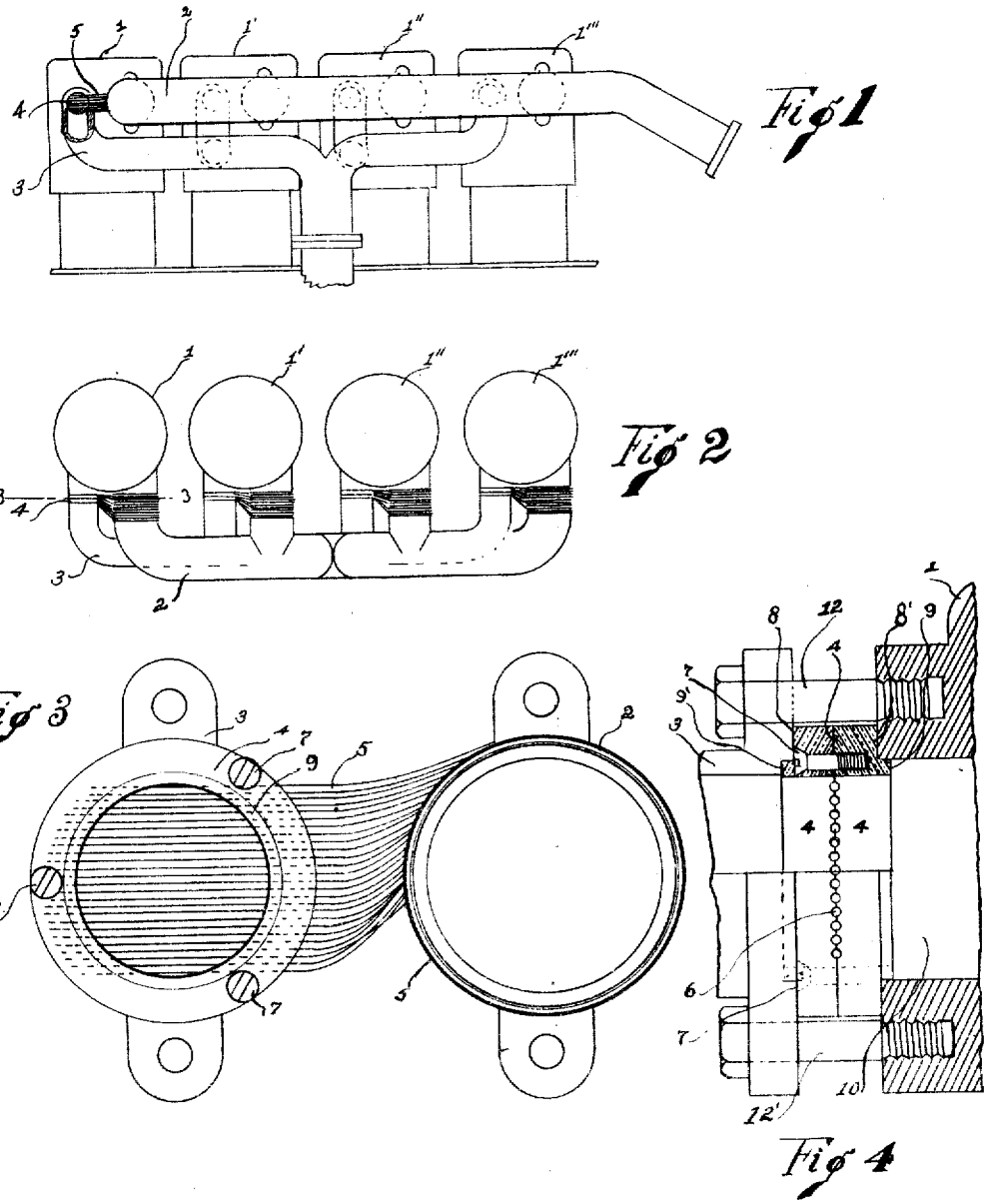

UNITED STATES PATENT OFFICE.

GEORGE A. RICHARDS, OF PUEBLO, COLORADO.

CHARGE-FORMING DEVICE FOR INTERNAL-COMBUSTION ENGINES.

1,345,507.   Specification of Letters Patent.   Patented July 6, 1920.

Application filed April 11, 1919. Serial No. 289,450.

*To all whom it may concern:*

Be it known that I, GEORGE A. RICHARDS, a citizen of the United States, and a resident of Pueblo, Pueblo county, Colorado, have invented certain new and useful Improvements in Charge-Forming Devices for Internal-Combustion Engines, of which the following is a specification.

This invention is an improvement in apparatus for the heating of the fuel used in an internal combustion or explosion engine and same is applicable to any such engine in which the fuel or explosive charge is in the form of a liquid, fluid or vapor.

The primary object of this invention is to heat the charge or explosive mixture, after same leaves the carbureter or mixing chamber and before its entrance into the cylinders of the engine through the intake manifold. Thus vaporization of the mixture is increased by raising the temperature of the fuel at a point where it cannot come into contact with the cold metal of the intake manifold—that is, at a point immediately adjacent to the engine block, same being between the intake manifold and the engine block itself, at the point where these two parts are usually joined. This is accomplished by conducting a part of the heat from the exhaust manifold by means of wires of a metal of high conductivity of heat, into the passages through which the vaporized fuel must pass on its way from the carbureter or mixing chamber to the explosion or combustion chamber.

A further object is to provide a means of heating the fuel mixture uniformly by causing all parts of same to come into contact with the surfaces of the wires which conduct heat from the exhaust manifold.

A further object of this invention is to provide a means of application of heat to the vaporized fuel mixture at such a point that said mixture will have no chance to cool before entering the explosion or combustion chamber.

Other objects of this invention will be apparent from the description of same set out hereinafter and from an inspection of the drawings and appended claims accompanying this application and the specific description thereof, in which drawings like characters of reference indicate like parts throughout the several views.

In the drawings:

Figure 1 represents the side elevation of an ordinary four-cylinder gas engine, showing one intake port in section.

Fig. 2 is a top view showing the method of attaching my invention.

Fig. 3 is an enlarged view on section 3—3 of Fig. 2 of the superheating device showing the method of attachment and showing also cross-section views of intake port and exhaust manifold.

Fig. 4 is a vertical section of this appliance showing method of insertion thereof between intake manifold and intake port of cylinder or engine block.

Referring now to the particular characters of reference in said drawings:

1, 1', 1'' and 1''' show the respective cylinders in a four-cylinder gas engine; 2 is the exhaust manifold and 3 is the intake manifold.

4 shows the device which is the subject of this application, provided with the wires 5, the latter of a metal which is a higher conductor of heat than the surrounding metal. Suitable holes 6 are provided in the two annular rings 4 and 4, which two annular rings are closely fitted together by the screws 7, 7, and 7 and inserted between the intake manifold and the intake port of the engine block. The outer face of each annular ring is provided with the projection 9 of the proper size to fit snugly into the intake manifold 3 and the intake port of the engine block 10, being clamped in this position by bolts 12 and 12'.

The wires 5 being plural in number are firmly clamped in place between the two annular rings 4 and 4 extending completely across the opening thereof, socketed in one side and extending beyond the other side beyond which said wires are wound about the exhaust manifold. Thus a screen is formed across the intake port of the engine and heat is conveyed from the exhaust manifold to this screen through which the entire charge of hydro-carbon mixture used to operate the engine must pass on its course from the carbureter or mixing chamber into the explosion chamber.

From this explanation it will be seen that this device provides a simple method of conveying the heat from the exhaust manifold to the interior of each intake port at a point therein which is the closest practicable point to the place of consumption of the fuel used in the engine. Thus the mixture is kept at a high temperature and more complete combustion ensues. No loss of heat from the mixture occurs for it does not come into contact with cold metal after leaving my device but goes at once into the engine block itself.

From this explanation it is apparent that this device is capable of considerable modification both as to size and form as engines of different power and fuel will require different amounts of heat, thus making necessary the use of different sized wires. All such modifications I consider within the spirit and scope of my invention.

I, therefore, claim as new:

1. A device of the character described, including two annular rings so joined together as to hold rigidly wires of high conductivity of heat, said wires extending across openings in said annular rings and forming a screen, said rings having extensions on the two outer faces thereof of proper size to fit into and between the intake manifold and intake port of an explosion or combustion engine, and method of removably securing same in this position between intake manifold and intake port of engine.

2. A device of the character described comprising means for conveying heat from the exhaust manifold of a combustion engine to the interior of the intake manifold thereof, said means consisting of wires of a high heat conductivity embracing the exterior of the exhaust manifold.

GEORGE A. RICHARDS.